United States Patent
Millar

(10) Patent No.: US 10,005,235 B2
(45) Date of Patent: Jun. 26, 2018

(54) METHODS AND SYSTEMS FOR MAKING A THREE-DIMENSIONAL OBJECT

(71) Applicant: Empire Technology Development LLC, Wilmington, DE (US)

(72) Inventor: Benjamin William Millar, Rosebery (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 692 days.

(21) Appl. No.: 14/479,817

(22) Filed: Sep. 8, 2014

(65) Prior Publication Data

US 2016/0067918 A1 Mar. 10, 2016

(51) Int. Cl.
*B29C 35/04* (2006.01)
*B29C 67/00* (2017.01)
*B29L 9/00* (2006.01)

(52) U.S. Cl.
CPC ...... *B29C 67/0055* (2013.01); *B29C 67/0092* (2013.01); *B29L 2009/00* (2013.01)

(58) Field of Classification Search
CPC ............ B29C 67/0059; B29C 67/0055; B29C 67/0092
See application file for complete search history.

(56) References Cited

U.S. PATENT DOCUMENTS

| 6,004,124 A | 12/1999 | Swanson et al. |
| 2008/0145639 A1 | 6/2008 | Sun et al. |
| 2012/0258250 A1 | 10/2012 | Rodgers |

FOREIGN PATENT DOCUMENTS

WO 2015017421 A2 2/2015

OTHER PUBLICATIONS

"Jello 3d printer," SpritesMods.com, Accessed at https://web.archive.org/web/20140102120747/http://spritesmods.com/?art=jello3dprinter&page=1, accessed on Jan. 29, 2016, p. 1-7.
International Search Report and Written Opinion for International PCT Application No. PCT/US2015/48307, dated Dec. 8, 2015.
"Analysis of metal deposition from Liquids," SAF Case Study, accessed at http://saf.chem.ox.ac.uk/Data/Sites/33/pdf/SAF%20Case%20Studies%20Metal%20dep.pdf, accessed on Jul. 15, 2014, p. 1-1.
"How hair gel enables freeform 3D printing with an undo function," accessed at http://web.archive.org/web/20131129063444/http://www.wired.co.uk/news/archive/2013-07/25/undo-3d-printing, accessed on Jun. 18, 2014, pp. 1-6.
"Ionic Liquids," ChemFiles, vol. 6, No. 9, pp. 1-20, Sigma-Aldrich Co. (2006).
"Suspended Depositions," accessed at http://nstrmnt.com/#/suspended-depositions/, accessed on Jun. 18, 2014, pp. 1-6.

(Continued)

*Primary Examiner* — Stella K Yi

(57) ABSTRACT

Methods for making a three dimensional object are disclosed. The method includes positioning a nozzle of an additive manufacturing device within a support matrix, extruding a feed material through the nozzle and into the support matrix, and moving the nozzle in a three-dimensional pattern within the support matrix, while depositing the feed material, thereby forming the three-dimensional object within the support matrix. Systems for making the three-dimensional object in accordance with the methods are also disclosed.

20 Claims, 7 Drawing Sheets

(56) References Cited

OTHER PUBLICATIONS

Chen, J., et al., "Self Healing of defected graphene," Applied Physics Letters, vol. 102, Issue 10, pp. 103107-1-103107-5 (2013).
Crosthwaite, J.M., et al., "Phase transition and decomposition temperatures, heat capacities and viscosities of pyridinium ionic liquids," The Journal of Chemical Thermodynamics, vol. 37, Issue 6, pp. 559-568.
Endres, F., and El Abedin, S.Z., "Air and water stable ionic liquids in physical chemistry," Physical Chemistry Chemical Physics (PCCP), vol. 8, pp. 2101-2116 (2006).
Hu, H., et al., Ultralight and Highly Compressible Graphene Aerogels, Advanced Materials, vol. 25, Issue 15, pp. (2013) 2219-2223.
Leandro, E.R., "Gelation of Ionic Liquids with Silica Nanoparticles: The Role of Cation Structure and Interactions," Esteban Rucavado Leandro, pp. 1-49 (2011).
Nordstrom, J., et al., "Effect of Lithium Salt on the Stability of Dispersions of Fumed Silica in the Ionic Liquid BMImBF4,"Langmuir vol. 28, No. 9, pp. 4080-4085 (2012).
Qiu, L., et al, "Biomimetic superelastic graphene-based cellular monoliths," Nature Communications, vol. 3, Article No. 1241, pp. 1-7 (2012).
Shimano, S., et al., "Preparation of Nanohybrid Solid-State Electrolytes with Liquidlike Mobilities by Solidifying Ionic Liquids with Silica Particles," Chemistry of materials, vol. 19, No. 22, pp. 5216-5221, American Chemical Society (2007).

METHODS AND SYSTEMS FOR MAKING A THREE-DIMENSIONAL OBJECT

BACKGROUND

Additive manufacturing (AM) is a class of fabrication techniques that use a layer-by-layer construction approach to create complex three-dimensional shapes. Additive manufacturing processes are highly flexible and can provide considerably higher material efficiencies than traditional subtractive manufacturing techniques. As a result, AM has been the subject of considerable innovation and research, resulting in a large variety of available processes and products.

Freeform printing can create components with complex geometries in a shorter time, and can offer significant component performance gains and production time, as compared to traditional layer by layer methods of additive manufacturing. The primary difficulty to be overcome in freeform printing is that of intrinsic support. To be printed freeform, a material must immediately harden and strengthen on deposition into unsupported air. Also, the specific physical requirements of these processes limit the choice of polymers, and other non-polymeric materials, for freeform printing.

SUMMARY

A method of making a three-dimensional object is disclosed. The method includes: positioning the nozzle of an additive manufacturing device within a support matrix; extruding a feed material through the nozzle and into the support matrix; and moving the nozzle in a three-dimensional pattern within the support matrix, while depositing the feed material, thereby forming the three-dimensional object within the support matrix.

A system for making a three-dimensional object is also disclosed. The system includes: a support matrix, and a nozzle configured to extrude a feed material and to move in a three-dimensional pattern within the support matrix, while depositing the feed material to form the three-dimensional object within the support matrix.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
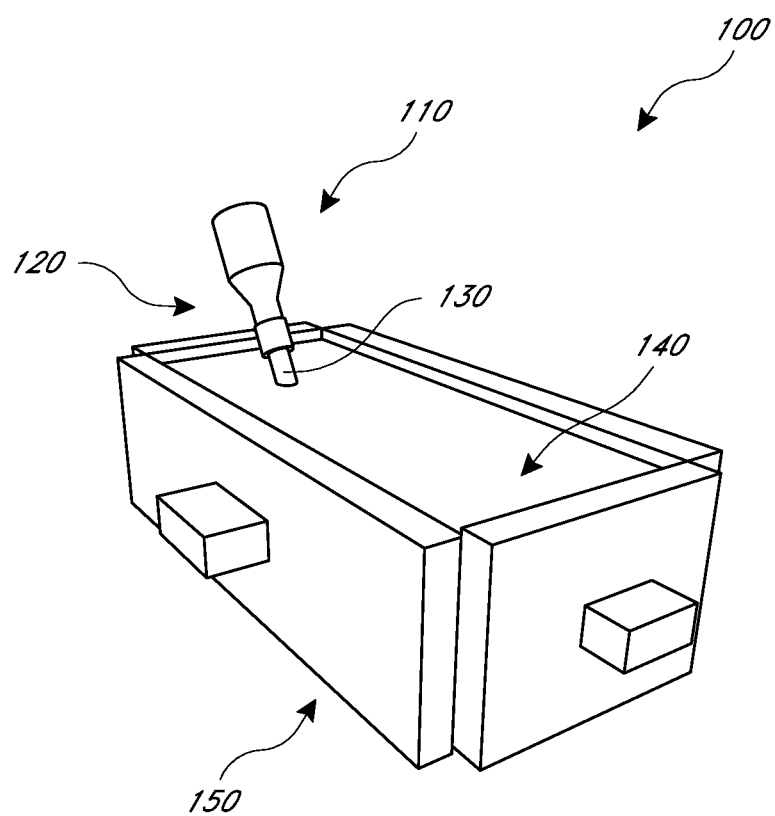
FIG. 1 shows a system for making a three-dimensional object in accordance with some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Method of Making a Three-Dimensional Object

Disclosed herein are methods of making a three-dimensional object. The method includes positioning a nozzle of an additive manufacturing device within a support matrix; extruding a feed material through the nozzle and into the support matrix; and moving the nozzle in a three-dimensional pattern within the support matrix, while depositing the feed material, thereby forming the three-dimensional object within the support matrix. In some embodiments, the additive manufacturing device is a freeform additive manufacturing device. In some embodiments, the support matrix maintains the feed material that is extruded in the three-dimensional pattern.

As the nozzle moves within the support matrix to deposit the feed material, the internal structure of the support matrix can become disrupted by the path of the nozzle (also referred to herein as "tool path"). In some embodiments, one or more portions of the support matrix is configured to self-heal after the nozzle has moved away from the one or more portions. The self-healing of the support matrix can repair disruptions or tool paths caused by the nozzle movement.

In some embodiments, the method further includes extruding an adhesive into one or more portions of the support matrix after the nozzle has moved away from the one or more portions. In some embodiments, the adhesive is configured to facilitate self-healing of the one or more portions of the support matrix after the nozzle has moved away from the one or more portions. In some embodiments, the adhesive is chemically stable at temperatures up to, equal to or above an extrusion temperature of the feed material. Suitable adhesives can generally be elastic adhesives, and may include Room Temperature Vulcanization (RTV) silicones, silicate based adhesives, alumina-silicate based adhesives, one-part epoxy resins, or any combination thereof.

In some embodiments, the support matrix exhibits shear thinning to permit nozzle movement and feed material deposition within the support matrix. For example, when a shearing force is applied to the support matrix, such as a shearing force that is generated when the nozzle is moving within the support matrix, portions of the support matrix where the force is applied may exhibit a reduction in viscosity to permit motion of the nozzle. The viscosity of the support matrix at these portions may revert to an original state after the shearing force is removed, for example, after the nozzle moves away.

The support material can be any material that can provide the structural integrity to support and contain the extruded feed material, and that can withstand high temperatures resulting from molten feed material extruded from the nozzle. In some embodiments, the support matrix is mechanically stable, chemically stable, or both, at temperatures up to, equal to or above an extrusion temperature of the feed material. The support matrix may also be of a material that is inert to the feed material, for example, non-corrosive to metallic feed materials.

In some embodiments, the support matrix is an aerogel. In some embodiments, the aerogel is a graphene aerogel. In some embodiments, the graphene aerogel is chemically stable at temperatures up to, equal to, or above about 1300° C. In some embodiments, the graphene aerogel is mechanically stable at temperatures up to, equal to, or above about 1300° C. Graphene aerogels generally have high structural integrity such that they can support significant weight. Graphene aerogels are typically also flexible, and can be compressed to about 90% of its original volume and yet retain their flexibility. Therefore, heavier feed materials such as metallic feed materials may be extruded into the graphene aerogel, and can retain its shape and position at the location of extrusion. Graphene aerogels can withstand high temperatures, for example, temperatures in excess of melting temperatures of most feed materials including metals. Graphene aerogels can be highly insulating, thereby slowing the cooling of the extruded feed material. This can be particularly advantageous for metallic feed materials as the slow cooling can allow fusing of the metallic feed material to previously extruded portions for an extended period of time. In addition, graphene aerogels can maintain their self-healing properties at high temperatures thereby enabling self-repair of tool paths generated by movement of the nozzle, and providing adequate longevity for the support matrix to serve for a full print.

In some embodiments, the support matrix is a gelled ionic liquid. In some embodiments, the gelled ionic liquid includes an ionic liquid gelled with a gelling agent. The gelling agent can be fumed silica, precipitated silica, chalk, carbon black, paraffin composition, silicone oil, or any combination thereof. In some embodiments, the ionic liquid is tris(2-hydroxyethyl)methylammonium methylsulfate, 1,2-dimethyl-3-propyl imidazolium bis(trifluorosulfonyl)imide, pyridinium, imidazolium, methylammonium based ionic liquids, or any combination thereof. In some embodiments, the ionic liquid is silicone, mineral oil, or both. The gelled ionic liquids can be non-toxic, and also biodegradable.

In some embodiments, the gelled ionic liquid includes a viscosity increasing agent. Suitable viscosity increasing agents include ionic compounds with large cations such as triethyloctylammonium, strongly coordinating anions such as nitrate ions ($NO_3^-$), alumina/silica nanoparticles, or any combination thereof. In some embodiments, the gelled ionic liquid includes an inorganic salt. Suitable inorganic salts include chlorides, silicates, sulfates, nitrates, phosphates, or any combination thereof. In some embodiments, the gelled ionic liquid includes a metallic salt. Suitable metallic salts include sodium chloride, calcium chloride, magnesium chloride, sodium silicate, calcium silicate, magnesium silicate, sodium sulfate, or any combination thereof. Other suitable metallic salts include salts of transition metals (for example, Cr, Ni, Zr, Cu, Au, or Pt), metal chlorides, metal nitrates, metal phosphates, metal sulfates, metal acetates, or any combination thereof.

The additives such as viscosity increasing agents and salts as described above may alter the physical properties of the gelled ionic liquid, for example, elevate the decomposition temperature, increase viscosity, enable in-situ anodizing or electroplating, and so on. For example, adding viscosity increasing agents may increase viscosity of the support matrix, adding inorganic salts may increase decomposition temperature of the support matrix, and adding metal salts may provide the ions required for in-situ electroplating or anodization of formed objects within the support matrix.

The choice of ionic liquid and gelling agent are not limited to those as disclosed herein, and can be selected based on the temperature of extrusion, the desired mechanical strength of the resulting support matrix material, and the desired shear thinning and thixotropy of the resulting support matrix material.

In a non-limiting example, ionic liquids gelled with fumed silica can form support matrices that can withstand significant weight of the feed material, thereby rendering the material suitable for supporting printed objects made of high density feed material such as metals, or large sized printed objects. In addition, fumed silica is a refractory gelling agent that imparts shear thickening and thixotropic properties to the gel it produces. In some embodiments, the fumed silica is present in the gelled ionic liquid in an amount of about 5% to about 10% by weight, for example, about 5%, about 6%, about 7%, about 8%, about 9%, about 10% by weight, or a percentage between any of these values.

Examples of gelled ionic liquids that include fumed silica include tris(2-hydroxyethyl)methylammonium methylsulfate gelled with fumed silica, silicone and mineral oil gelled with fumed silica, or 1,2-dimethyl-3-propyl imidazolium bis(trifluorosulfonyl)imide gelled with fumed silica. In these combinations, the fumed silica may be present in the gelled ionic liquid in an amount of about 5% to about 10% by weight.

In some embodiments, the support matrix has a gas solubility of less than or equal to about 0.2 mol/kg at standard temperature and pressure. In some embodiments, the support matrix has a gas permeability of less than or equal to about 200 barrer ($6.7 \times 10^{-17}$ kmol m/(m² s Pa)). External gas (for example, oxygen) may transport to the surface of freshly printed feed material, and may cause damage to its surface. The degree to which the support matrix excludes gas transport can be determined by permeability of the gas through the support matrix, solubility of the gas in the support matrix, and thickness of the support matrix. The gas solubility and permeability values as described herein provide an approximate maximum threshold value that can ensure a sufficiently low level of external gas transport through the support matrix to the extruded feed material during the printing process. A sufficiently low level of gas transport can minimize surface damage to the extruded feed material.

In some embodiments, the support matrix is held within a confined volume at an unstrained pressure of at least about 8 kPa. Unstrained pressure, as used herein, refers to static compressive pressure exerted on the support matrix. The application of the unstrained pressure can facilitate self-healing of the matrix material, and increase rigidity of the matrix material. The static compressive pressure may be exerted by walls of a container confining the support matrix, by compressive forces that are produced as the feed material is extruded into the support matrix, or both. Before extruding the feed material into the support matrix, the unstrained pressure acting on the support matrix, for example compressive pressure exerted by walls of the container confining the support matrix, may be about 8 kPa or more. During printing, regions of the support matrix can be compressed at up to about 0.5 MPa to about 150 MPa, while deforming, to accommodate the extruded feed material. The extra compressive pressure experienced by a region of the support matrix during the extrusion is usually temporary and may be a consequence of the introduction of extruded or deposited feed material volume. The extra pressure is usually relieved by a reduction in volume as a result of compression deformation of the support matrix in that region after the feed material is extruded in that region.

The speed at which the nozzle moves within the support matrix may depend on several factors. For a graphene aerogel support matrix, the speed at which the nozzle moves within the support matrix depends on the feed material and the extrusion rate. For example, the speed at which the nozzle moves through the graphene aerogel can be about 1 mm/s to about 10 mm/s. For a gelled ionic liquid support matrix, the nozzle movement must generally exceed a minimum speed for shear thinning to occur so as to allow nozzle passage through the gel. The rate is generally dependent on the material of the support matrix, and may be about 3 mm/s.

In some embodiments, the nozzle of the additive manufacturing device is mounted on a multi-axis extrusion head. By mounting onto the multi-axis extrusion head, the nozzle can be designed to move in multiple axes (for example, x, y and z axes) without being bound by particular axes of movement. The multi-axis extrusion head can for example be a six-axis arm having six degrees of freedom of movement that can move the nozzle to at least some or all points on the support matrix from multiple angles and directions.

In some embodiments, the method further includes heating the feed material before the extruding step. In some embodiments, heating the feed material includes heating with one or more heating elements in thermal communication with the feed material in the nozzle. In some embodiments, the one or more heating elements are disposed inside the nozzle. In some embodiments, the one or more heating elements are configured to provide a nozzle temperature that increases toward an extrusion opening of the nozzle. In some embodiments, the heating elements are arranged in increasing density toward the extrusion opening of the nozzle, operating at increasing power toward the extrusion opening of the nozzle, or both. In some embodiments, one or more heating elements are resistive heating elements.

In some embodiments, the feed material is heated to a liquid state, or to a partially liquid state. For example, where the support matrix has pores such as in the case of aerogel support matrices, the feed material may be heated to a partial liquid state so that it is flowable for extrusion but still viscous enough to avoid the pores. The feed material can be a metallic material or a non-metallic material. In some embodiments, the feed material is a polymer, a ceramic, a metal, or any combination thereof. In some embodiments, the feed material is a polymer. Examples of suitable polymers include polylactic acid (PLA), acrylonitrile butadiene styrene (ABS), polyethylene, silicone, or any combination thereof. In some embodiments, the feed material is a ceramic. In some embodiments, the feed material is a metal. For example, the metal can be steel, copper, aluminum, titanium, silver, gold, nickel, magnesium, zinc, tin, cupronickel, alloys thereof, or any combination thereof. The feed material can be in various forms before the extrusion. In some embodiments, the feed material is a powder, a filament, or both. The feed material can be extruded in powder form, in liquid form, or in partial liquid form. For example, where the feed material is a filament, the filament can be fed into the nozzle where it can be heated to form the liquid or partial liquid feed material for extrusion.

In some embodiments, moving the nozzle includes cutting through the support matrix as the nozzle advances through the support matrix. In some embodiments, cutting the support matrix includes cutting with a cutting blade. The cutting blade can be attached to the nozzle, for example at an extrusion end of the nozzle, to facilitate movement of the nozzle through the support matrix. For the ionic liquid thixotropic gel embodiments, vibration of the nozzle during extrusion or deposition may be used to allow for easier passage though the gel support.

The nozzle can be made of any material that can withstand high extrusion temperatures of the feed material. In some embodiments, the nozzle is made of a metal, an alloy, a ceramic, or any combination thereof. In some embodiments, the nozzle is made of stainless steel. The nozzle may be configured to reduce or to eliminate heat loss from the heating elements to the surrounding so as to maintain heating efficiency of the heating elements. In some embodiments, the nozzle is thermally insulated.

In some embodiments, the method further includes removing the three-dimensional object from the support matrix. The removing can be achieved for example by cutting or tearing the support matrix from the three dimensional object. Alternatively, in some embodiments, the support matrix can be thixotropic to allow removal of the three-dimensional object. For example, the thixotropic support matrix may become less viscous when a shear force is applied to the support matrix to allow separation of the three-dimensional object from the support matrix. In some embodiments, the method further includes agitating the support matrix until it transitions from a gel phase to a liquid phase. The agitating can for example include shaking, stirring or other means of applying the shear force to the support matrix.

System for Making a Three-Dimensional Object

Disclosed herein are systems for making a three-dimensional object. The system includes: a support matrix, and a nozzle configured to extrude a feed material and to move in a three-dimensional pattern within the support matrix, while depositing the feed material to form the three-dimensional object within the support matrix. The system can be configured for use in a freeform additive manufacturing device.

In some embodiments, the nozzle is mounted on a multi-axis extrusion head. As described above, the multi-axis extrusion head can enable the nozzle to move in multiple axes (for example, x, y and z axes) without being bound by particular axes of movement. The multi-axis extrusion head can for example be a six-axis arm as described above.

In some embodiments, the nozzle includes one or more heating elements configured to heat the feed material to a liquid state or to a partial liquid state before extrusion. The one or more heating elements and configurations of the one or more heating elements may be as described above.

In some embodiments, the nozzle includes a cutting blade. The cutting blade can for example be attached to an extrusion end of the nozzle. The cutting blade may facilitate movement of the nozzle through the support matrix by cutting the support matrix as the nozzle advances through the support matrix.

The support matrix can maintain the feed material that is extruded in the three-dimensional pattern. The support matrix may also be able to withstand high temperatures resulting from molten feed material extruded from the nozzle. In some embodiments, the support matrix is mechanically stable, chemically stable, or both at matrix temperatures up to, equal to or above an extrusion temperature of the feed material. The support matrix may be confined within a container. The size of the container may be dependent on the size of the three-dimensional object to be formed. For example, the larger the size of the object, the larger the volume of support matrix, and hence the larger the size of the container.

As described above, the support matrix may have self-healing properties to repair internal structures disrupted by the nozzle movement. In some embodiments, one or more positions of the support matrix are configured to self-heal after the nozzle has moved away from the one or more portions.

In some embodiments, the system further includes a second nozzle configured to extrude an adhesive into one or more portions of the support matrix after the nozzle has moved away from the one or more portions. The second nozzle can be positioned such that the adhesive is extruded into tool paths formed by the moving nozzle at one or more portions of the support matrix, for example, behind the lead nozzle that contains the feed material. In some embodiments, the adhesive is configured to facilitate self-healing of the one or more portions of the support matrix after the nozzle has moved away from the one or more portions. In some embodiments, the adhesive is chemically stable at temperatures up to, equal to, or above an extrusion temperature of the feed material. Suitable examples of adhesives can be elastic adhesives such as those described above.

In some embodiments, the support matrix exhibits shear thinning to permit nozzle movement and feed material deposition within the support matrix. As described above, the shear thinning property of the support matrix enables the support matrix to become less viscous at portions surrounding the moving nozzle to facilitate movement.

In some embodiments, the support matrix is thixotropic to allow removal of the three-dimensional object. As described above, the thixotropic support matrix may become less viscous when a shear force is applied to the support matrix to allow separation of the three-dimensional object from the support matrix. In some embodiments, the system further includes an agitator to agitate the support matrix until it transitions from a gel phase to a liquid phase. The agitator can for example to a shaker, a stirrer or other apparatus that can apply a shear force to the support matrix without damaging the formed three-dimensional object.

FIG. 1 shows a system 100 for making a three-dimensional object in accordance with some embodiments. The system 100 includes an additive manufacturing extruder 110 having an extrusion nozzle 130 attached to an extrusion head 120. The extrusion nozzle 130 may deposit a feed material into a support matrix 140. The extrusion head 120 may be a multi-axis extrusion head, for example a six-axis arm as described above.

One or more heating elements (not shown) may be disposed inside the extrusion nozzle 130, for example, to be in thermal communication with the feed material in the extrusion nozzle 130. The one or more heating elements may be resistive heating elements. The feed material may be as described above, and can for example be a polymer, a metal, or a ceramic. The feed material may be heated to a liquid state or to a partial liquid state before extrusion. For example, the feed material may initially be a solid feedstock which is heated to a liquid or to a partially liquid state in the extrusion nozzle 130.

The support matrix 140 may be substantially confined by a container 150. The support matrix 140 may be any material that has the structural integrity to support and contain the feed material, and that can exhibit mechanical stability and chemical stability at temperatures consistent with the operating conditions of the additive manufacturing extrusion. The support matrix 140 can be of a material as described above, for example, an aerogel or a gelled ionic liquid. The support matrix 140 can be configured to self-heal at one or more portions after the nozzle has moved away from the one or more portions.

The system 100 may further include an additional or a second nozzle (not shown) configured to extrude an adhesive as described above into a space between the feed material and the support matrix 140, after extruding the feed material into the support matrix 140. The adhesive can be configured to facilitate self-healing of the support matrix 140 after the feed material is extruded. The adhesive may be chemically stable at temperatures consistent with the operating conditions of the additive manufacturing extrusion.

The support matrix 140 may exhibit shear thinning to permit nozzle 130 movement through the support matrix 140, and feed material deposition within the support matrix 140. In addition, the support matrix 140 may be thixotropic to allow for removal of the three-dimensional object from the support matrix 140, for example, by agitating the support matrix 140 until it transitions from a gel phase to a liquid phase.

Figure 2A:
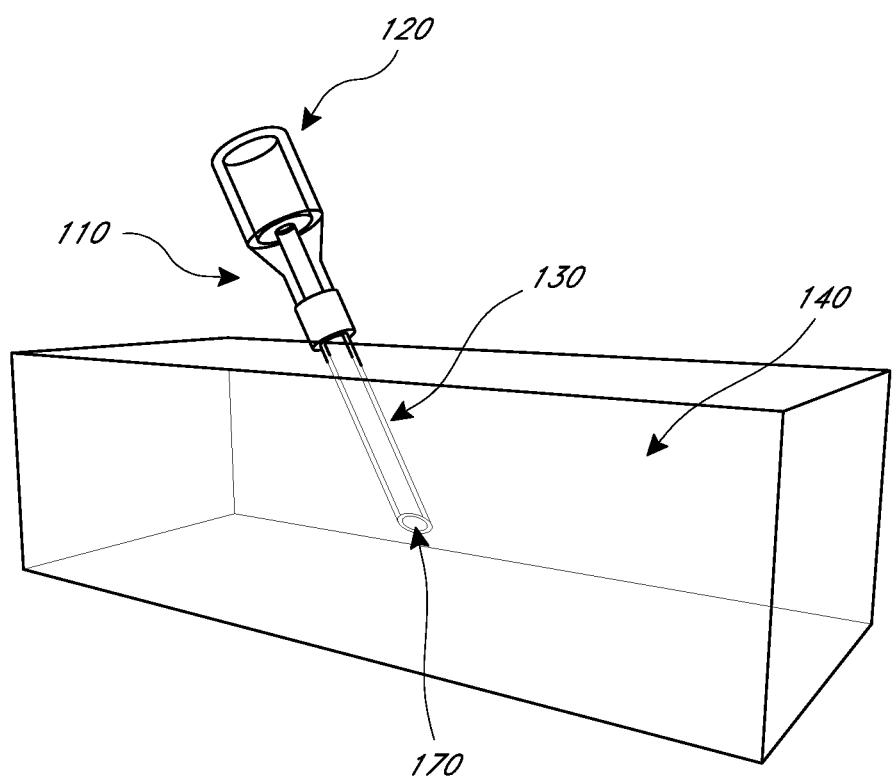
FIGS. 2A-E show exemplary extrusion paths through the support matrix in accordance with some embodiments.
Figure 2B:
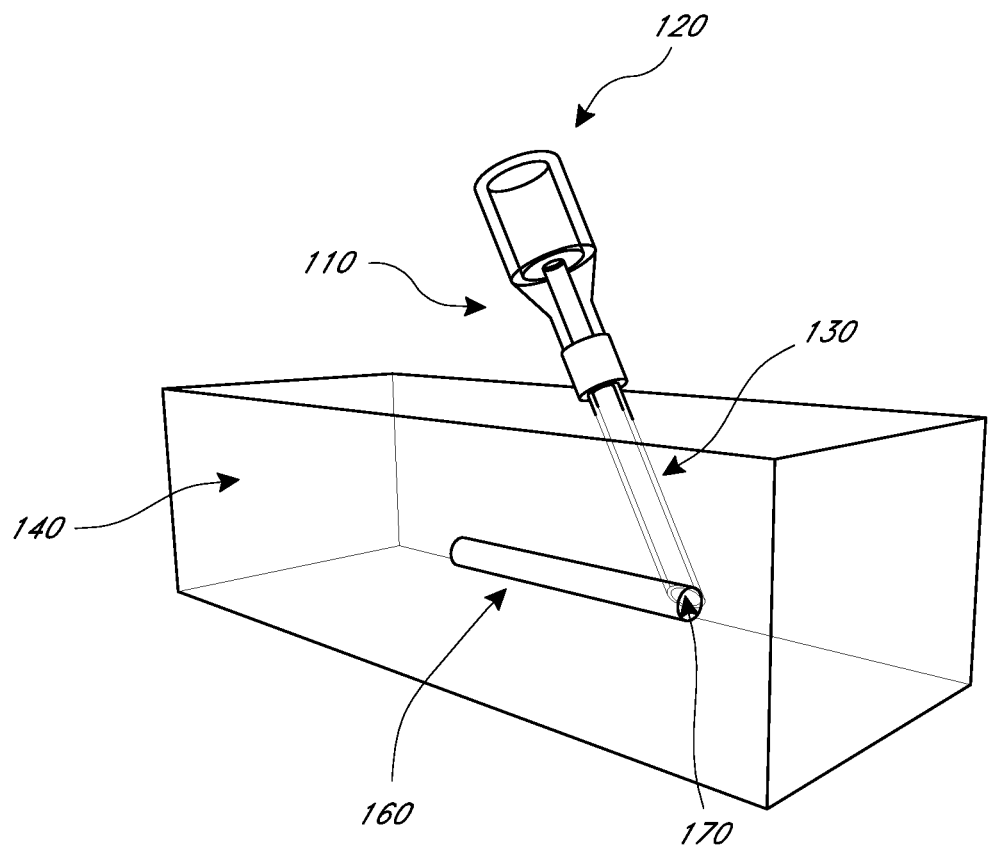
Figure 2C:
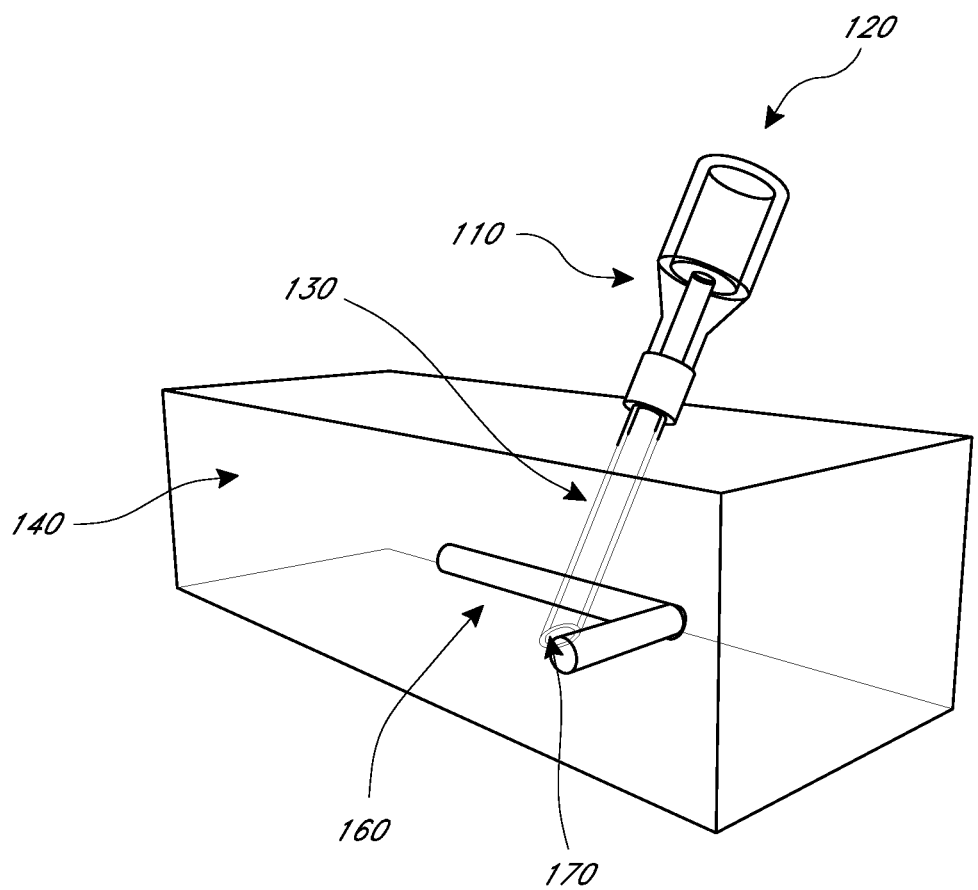
Figure 2D:
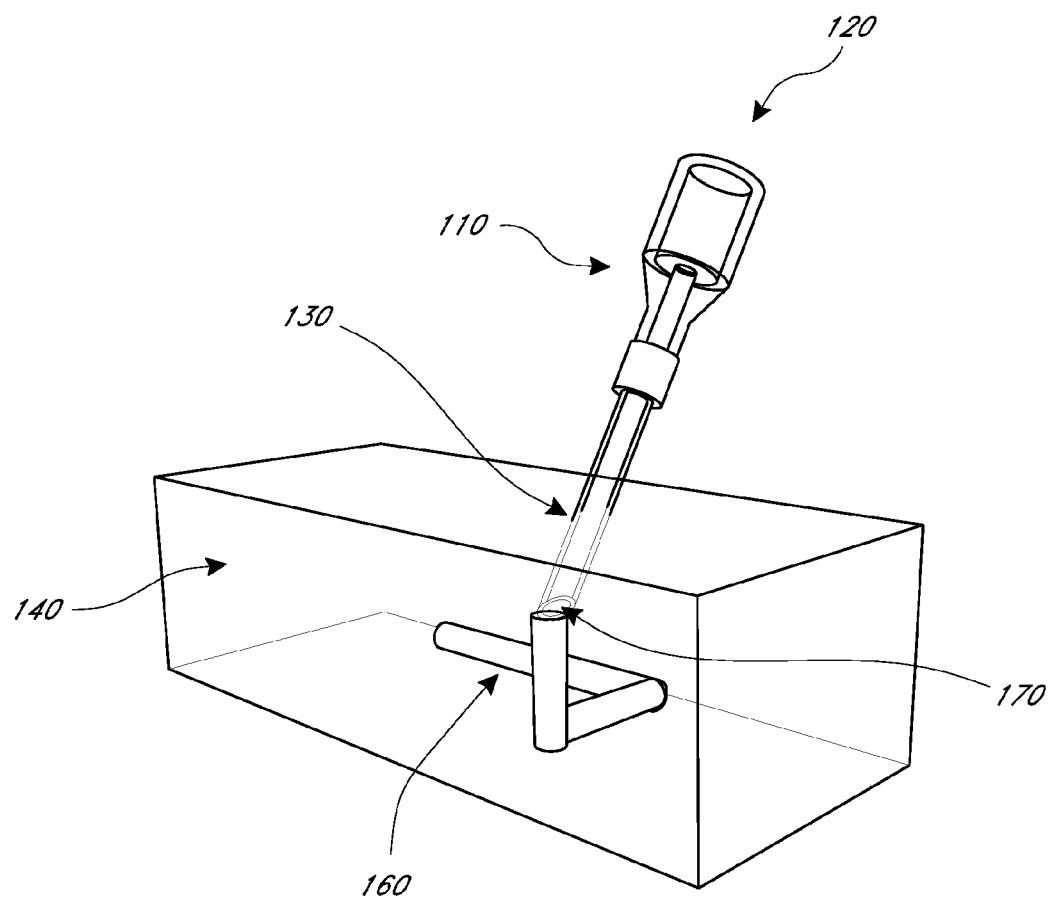
Figure 2E:
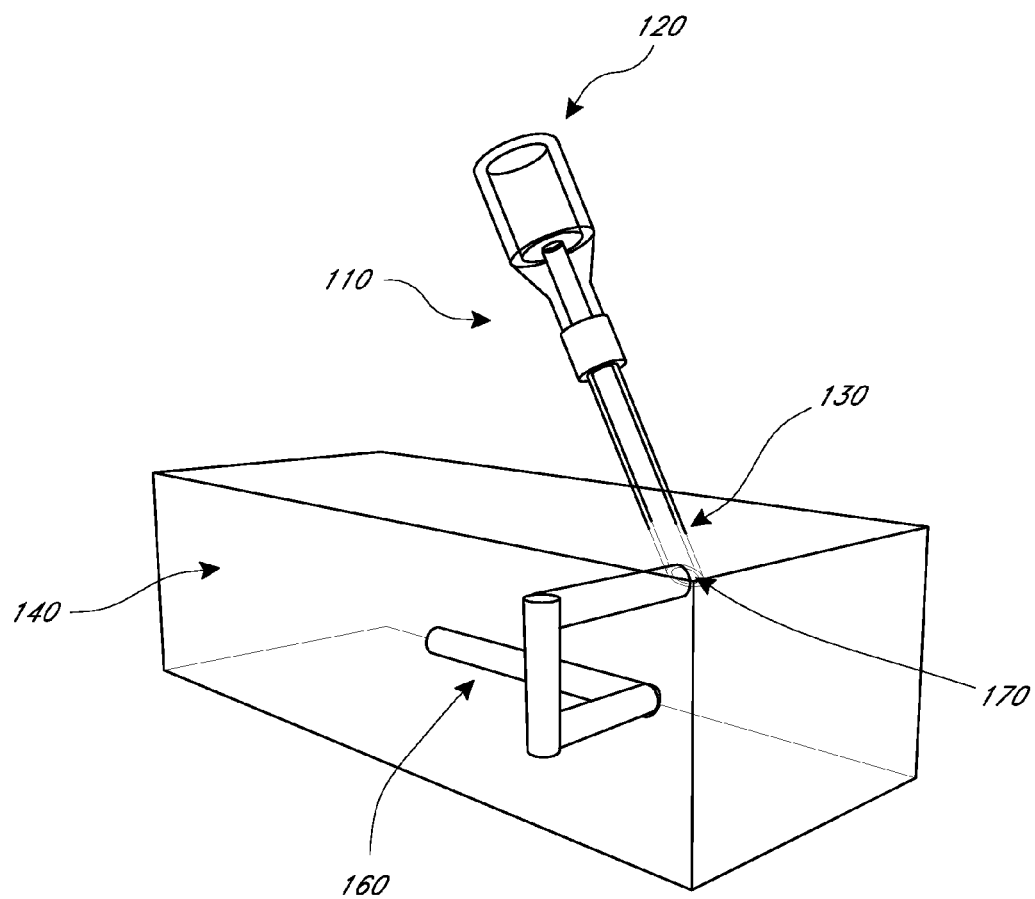

FIG. 2A shows the extrusion nozzle 130 inserted into the support matrix 140 prior to any freeform extrusion. In FIG. 2B, the nozzle 130 has travelled in a linear path, while extruding feed material into the support matrix 140. The extruded feed material is shown as a bead or line of material which is mechanically supported within the support matrix 140, so as to maintain its structural integrity as it solidifies. In FIG. 2C, the nozzle 130 has made a turn of approximately 90 degrees within the same plane (for example, x-y axis) of the support matrix 140, such that the extruded feed material forms an L-shaped structure. In FIG. 2D, the nozzle 130 has made another turn of approximately 90 degrees, moving upward (for example, z-axis) through the support matrix 140. In FIG. 2E, the nozzle 130 has made another turn of approximately 90 degrees within the same plane (for example, x-y axis) to form the final portion of the three-dimensional object within the matrix material. In some embodiments, movement of the extrusion nozzle 130 cuts the support matrix 140 as the nozzle advances through the support matrix 140. The extrusion nozzle 130 may be fitted with a cutting blade to facilitate movement through the support matrix 140. In some embodiments, the nozzle movement through FIGS. 2A to 2E may be controlled through manual manipulation of the multi-axis head. In other embodiments, the movement is pre-programmed to yield an extrusion pathway that forms a desired three-dimensional object.

Figure 3:
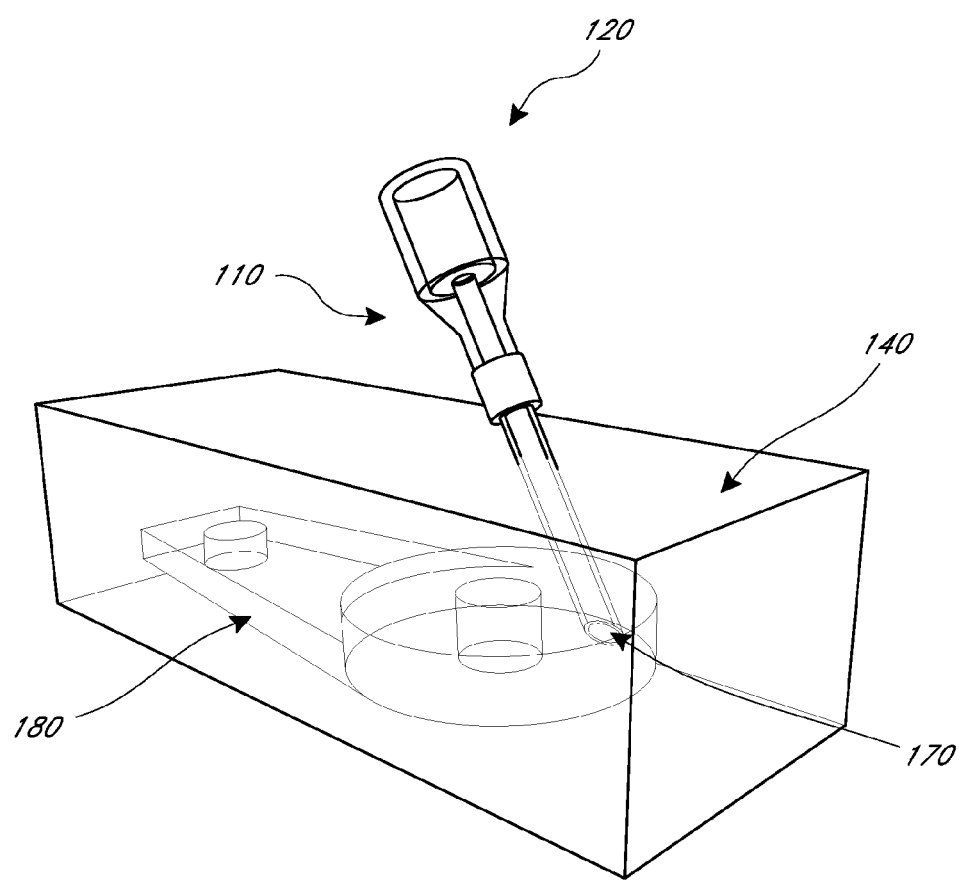
FIG. 3 shows a three-dimensional object created within the support matrix of a system for making a three-dimensional object in accordance with some embodiments.

FIG. 3 shows a three-dimensional object 180 created within the support matrix 140 by freeform additive manufacturing. The three-dimensional object 180 may be removed from the support matrix 140 by agitating the support matrix until it transitions from a gel to a liquid phase, and then lifting the three-dimensional object 180 out of the liquid support matrix 140.

Comparative Benefits and Advantages

The methods and systems for forming three-dimensional objects as described herein provide modes of freeform additive manufacturing in which objects may be produced with any orientation, dimensions or aspect ratios. Unlike conventional layer by layer printing of fused deposition modelling (FDM) in which motion of the extrusion nozzle is restricted by support structures of the printer, the extrusion nozzle of the methods and systems described herein can move in a freeform manner. Due to the freeform motion of the extrusion nozzle, objects with complex geometries and intricate details can be printed.

As there is no need for a layer to be solidified before printing the next layer, the methods and systems described herein can print at faster speeds relative to conventional layer by layer printing using FDM. There is also no need for retooling during the printing process, for example when geometries of parts, feed materials, or other parameters, change. Where the feed material is a metal, the use of casting can be avoided as the support matrix can support the extruded liquid metal in the desired shape, thereby enabling both metallic and non-metallic feeds to be printed using the same system. Therefore, the methods and systems described herein can enable freeform rapid prototyping using both metallic and non-metallic materials.

The methods and systems as described herein can be scalable to form objects of larger sizes, such as parts used in construction and automobiles. For example, to extrude large-sized parts that do not require high resolution, a large diameter extrusion nozzle can be used to form parts such as springs, shaped billets, cams, ingots, slabs and so on.

The methods and systems described herein can optimize mechanical properties of formed objects. For example, intrinsic strengthening of an object can be achieved by designing extrusion paths for microstructural alignment. Another advantage of the methods and systems described herein is that the support matrix can be adapted to allow in-situ electroplating or anodizing of the form object. For example, the support matrix may be formed of gelled ionic liquids doped with metal salts as described above to enable the in-situ electroplating or anodizing.

EXAMPLES

Example 1

Freeform Extrusion of Metallic Feed Material into Graphene Aerogel Support Matrix The present example describes a method of making a three-dimensional object by freeform extrusion of a metallic feed material into a graphene aerogel support matrix.

A ceramic nozzle of a freeform additive manufacturing device is positioned within the graphene aerogel support matrix. The feed material is cupronickel which is an alloy of copper and nickel. The feed material is in filament form which is injected into the nozzle. The ceramic nozzle includes heating elements that heat the feed material to about 1150° C. or to a partially liquid state so that the feed material is flowable but still of a viscosity that can avoid flowing into pores of the aerogel. The support matrix is chemically and mechanically stable at temperatures up to, equal to or above the temperature of the molten feed material (or extrusion temperature). The support matrix is held within a confined volume at an unstrained pressure of about 8 kPa. During printing, regions of the support matrix are compressed at up to 100 MPa while deforming to accommodate extruded feed material. The extrusion nozzle is positioned within the support matrix, and is moved through the support matrix in a three-dimensional pattern while depositing the feed material along its path. The nozzle is moved through the support matrix at a speed of about 5 mm/s. The nozzle is moved in a combination of geometric pathways to extrude the feed material in the three-dimensional pattern, including linearly, curvi-linearly, zig-zag, and circularly. As the nozzle passes through a portion of the support matrix, that portion self-heals after the nozzle moves away from that portion. The total weight of feed material that is deposited within the support matrix is about 10 kg.

Once the feed material is completely deposited, the support matrix is agitated until it transitions from a gel to a liquid phase to separate the three-dimensional object from the support matrix. The three-dimensional object is then removed from the support matrix.

This example demonstrates that freeform printing of a feed material is possible using the methods and systems described herein. By using a support matrix such as a graphene aerogel, physical support can be provided to the deposited feed material to contain the feed material at its location of extrusion, thereby enabling freeform creation of a three dimensional object. This example also demonstrates that freeform printing is possible with feed materials of significant weight, such as metals.

Example 2

Freeform Extrusion of Feed Material into a Support Matrix with Improved Self-healing the Support Matrix and Facilitated Nozzle Movement within the Support Matrix The present example describes a method of making a three-dimensional object that is similar to Example 1, except that the ceramic nozzle has a cutting blade attached to an extrusion end of the nozzle, and an adhesive is extruded into paths formed by the moving nozzle to facilitate self-healing.

The extrusion nozzle is positioned within the support matrix, and is moved through the support matrix in a three-dimensional pattern while depositing the feed material along its path. The cutting blade at the extrusion end of the nozzle facilitates movement of the nozzle by rotating in the direction of nozzle motion and cutting portions of the support matrix in its path to facilitate penetration of the nozzle. The nozzle is moved through the support matrix at a speed of about 10 mm/s. The nozzle is moved in a combination of geometric pathways as described in Example 1 to extrude the feed material in the three-dimensional pattern. As the nozzle passes through a portion of the support matrix, a second nozzle that lags behind the feed extrusion nozzle extrudes an elastic adhesive into that portion to facilitate self-healing. The elastic adhesive is a Room Temperature Vulcanization (RTV) silicone.

Once the feed material is completely deposited, the support matrix is removed from the support matrix in a manner as described in Example 1.

This example demonstrates that movement of the nozzle can be enhanced by means of the cutting blade, for example, the speed of nozzle movement can be increased to speed up the printing process. This example also demonstrates that self-healing of the support matrix can be facilitated using elastic adhesives. The adhesive can speed up the self-healing process and thus reduce the wait time for the feed material to be deposited at the healed portions of the support matrix.

Example 3

Freeform Extrusion of Filament Metallic Feed Material into Gelled Ionic Liquid Support Matrix The present example describes a method of making a three-dimensional object by freeform extrusion of a metallic feed material into a gelled ionic liquid support matrix.

A stainless steel nozzle of a freeform additive manufacturing device is positioned within the gelled ionic liquid support matrix. The gelled ionic liquid is tris(2-hydroxyethyl)methylammonium methylsulfate gelled with fumed silica. The fumed silica is present in the gelled ionic liquid in an amount of about 8% by weight. The feed material is silver. The feed material is in filament form which is injected into the nozzle. The nozzle includes heating elements that heat the feed material to about 1000° C. or to a liquid state. The support matrix is chemically and mechanically stable at temperatures up to, equal to or above the temperature of the molten feed material (or extrusion temperature). The extrusion nozzle is positioned within the support matrix, and is moved through the support matrix in a three-dimensional pattern while depositing the feed material along its path. The nozzle is moved through the support matrix at a speed of about 3 mm/s. The nozzle is moved in a combination of geometric pathways to extrude the feed material in the three-dimensional pattern, including linearly, curvi-linearly, zig-zag, and circularly. As the nozzle passes through a portion of the support matrix, that portion self-heals after the nozzle moves away from that portion. The total weight of feed material that is deposited within the support matrix is about 5 kg.

Once the feed material is completely deposited, the three-dimensional object is manually removed from the support matrix by tearing away the support matrix from the object.

Although not described in this example, it will be appreciated that the cutting blade and the adhesive described in Example 2 may also be applicable in this example to add improvements to the printing process.

This example demonstrates that freeform printing of a feed material is possible using the methods and systems described herein. By using a support matrix such as a gelled ionic liquid, physical support can be provided to the deposited feed material to contain the feed material at its location of extrusion, thereby enabling freeform creation of a three dimensional object. This example also demonstrates that freeform printing is possible with feed materials of significant weight, such as metals.

Example 4

Freeform Extrusion of Powder Metallic Feed Material into Gelled Ionic Liquid Support Matrix The present example describes a method of making a three-dimensional metal object by freeform extrusion of a powder metallic feed material into a gelled ionic liquid support matrix.

A stainless steel nozzle has a cutting blade attached to an extrusion end of the nozzle. The nozzle is positioned within the support matrix. The gelled ionic liquid is tris(2-hydroxyethyl)methylammonium methylsulfate gelled with fumed silica. The fumed silica is present in the gelled ionic liquid in an amount of about 8% by weight. The feed material is an alloy of magnesium and aluminum. The feed material is in powder form, which is injected into the nozzle. The feed material is not melted during extrusion, but instead is deposited in compressed powder form. The extrusion nozzle is positioned within the support matrix, and is moved through the support matrix in a three-dimensional pattern while depositing the feed material along its path. The cutting blade at the extrusion end of the nozzle facilitates movement of the nozzle by rotating in the direction of nozzle motion and cutting portions of the support matrix in its path to facilitate penetration of the nozzle. The nozzle is moved through the support matrix at a speed of about 5 mm/s. The nozzle is moved in a combination of geometric pathways to extrude the feed material in the three-dimensional pattern, including linearly, curvi-linearly, zig-zag, and circularly. As the nozzle passes through a portion of the support matrix, that portion self-heals after the nozzle moves away from that portion. The total weight of feed material that is deposited within the support matrix is about 1 kg. The feed material remains in powder form throughout the extrusion process. Once the extrusion is completed, the nozzle is removed, and the entire support matrix (including the object formed by the extruded feed material) is annealed for about 6 hours at a sintering temperature of about 450° C. to solidify the extruded material. The entire structure is cooled to room temperature, for example, 25° C. The object is then mechanically removed from the support matrix.

The extrusion of metal powder can allow for control of alloying without the need to consider liquid metallurgy constraints of phase segregation (alloying elements can be combined with no liquid phase). In addition, the metal powder extrusion can allow for control over dimensions of formed objects, as contractions experienced during liquid metal extrusion can be avoided. The metal powder particle size can also be controlled to allow for control over final porosity and density in the formed object. Where the support matrix has pores, such as in graphene aerogels, the surface of the final object may be finished to a higher consistency, smoothness and small dimension accuracy by employing powder particles of greater diameter than pore size of the support matrix. Annealing time can also be varied to allow for deliberate variations of microstructure in the formed objects.

This example demonstrates that freeform printing using powdered feed material is possible using the methods and systems as described herein. While the example is described using gelled ionic liquid support matrix, it will be appreciated that aerogel-based support matrices may also be applicable.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," and so on). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, and so on" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, and so on). In those instances where a convention analogous to "at least one of A, B, or C, and so on" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, and so on). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, and so on. As a non-limiting example, each range discussed herein can be readily broken down into a lower third, middle third and upper third, and so on. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of making a three-dimensional object, the method comprising:
   positioning a nozzle of an additive manufacturing device within a support matrix wherein the support matrix is an aerogel or a gelled ionic liquid;
   extruding a feed material through the nozzle and into the support matrix; and
   moving the nozzle in a three-dimensional pattern within the support matrix, while depositing the feed material, thereby forming the three-dimensional object within the support matrix, wherein moving the nozzle comprises cutting through the support matrix as the nozzle advances through the support matrix.

2. The method of claim 1, wherein one or more portions of the support matrix are configured to self-heal after the nozzle moves away from the one or more portions.

3. The method of claim 2, further comprising extruding an adhesive into the one or more portions of the support matrix after the nozzle moves away from the one or more portions.

4. The method of claim 3, wherein the adhesive is configured to facilitate self-healing of the one or more portions of the support matrix after the nozzle moves away from the one or more portions.

5. The method of claim 1, wherein the support matrix exhibits shear thinning to permit nozzle movement and feed material deposition within the support matrix.

6. The method of claim 1, wherein the support matrix is thixotropic to allow removal of the three-dimensional object.

7. A method of making a three-dimensional object, the method comprising:
   positioning a nozzle of an additive manufacturing device within a support matrix, wherein the support matrix is a graphene aerogel;
   extruding a feed material through the nozzle and into the support matrix; and
   moving the nozzle in a three-dimensional pattern within the support matrix, while depositing the feed material, thereby forming the three-dimensional object within the support matrix.

8. The method of Claim 1, wherein the gelled ionic liquid comprises an ionic liquid gelled with fumed silica, precipitated silica, chalk, carbon black, paraffin composition, silicone oil, or any combination thereof.

9. The method of claim 8, wherein the ionic liquid is tris(2-hydroxyethyl)methylammonium methylsulfate, 1,2-dimethyl-3-propyl imidazolium bis(trifluorosulfonyl)imide, pyridinium, imidazolium, methylammonium based ionic liquids, or any combination thereof.

10. The method of claim 8, wherein the ionic liquid is silicone, mineral oil, or both.

11. A method of making a three-dimensional object, the method comprising:
    positioning a nozzle of an additive manufacturing device within a support matrix;
    extruding a feed material through the nozzle and into the support matrix; and
    moving the nozzle in a three-dimensional pattern within the support matrix, while depositing the feed material, thereby forming the three-dimensional object within the support matrix, wherein the support matrix has a gas solubility of less than or equal to about 0.2 mol/kg at standard temperature and pressure, or wherein the support matrix has a gas permeability of less than or equal to about 200 barrer ($6.7 \times 10^{-17}$ kmol m/(m$^2$ s Pa)).

12. The method of claim 1, further comprising heating the feed material before the extruding step.

13. The method of claim 12, wherein the feed material is heated to a liquid state, or to a partial liquid state.

14. The method of claim 1, wherein the feed material is a polymer, a ceramic, a metal, or any combination thereof.

15. The method of claim 1, further comprising agitating the support matrix until it transitions from a gel phase to a liquid phase.

16. The method of claim 15, further comprising removing the three-dimensional object from the support matrix.

17. The method of claim 7, wherein one or more portions of the support matrix are configured to self-heal after the nozzle moves away from the one or more portions.

18. The method of claim 11, wherein one or more portions of the support matrix are configured to self-heal after the nozzle moves away from the one or more portions.

19. The method of claim 1, wherein the gelled ionic liquid comprises an additive.

20. The method of claim 19, wherein the additive is at least one of a viscosity increasing agent, an inorganic salt, or a metallic salt.

* * * * *